Sept. 18, 1928.  1,684,889
C. L. RUSS
DOUBLE ACTING DRAWER AND SLIDE THEREFOR
Filed April 2, 1928  7 Sheets-Sheet 1
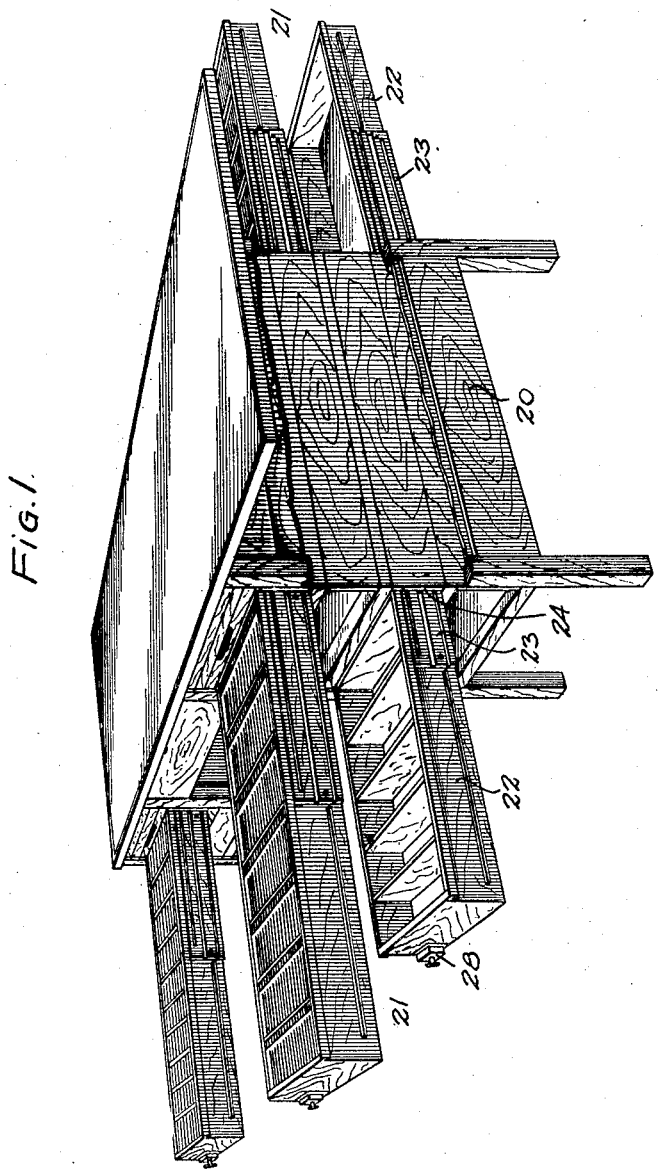

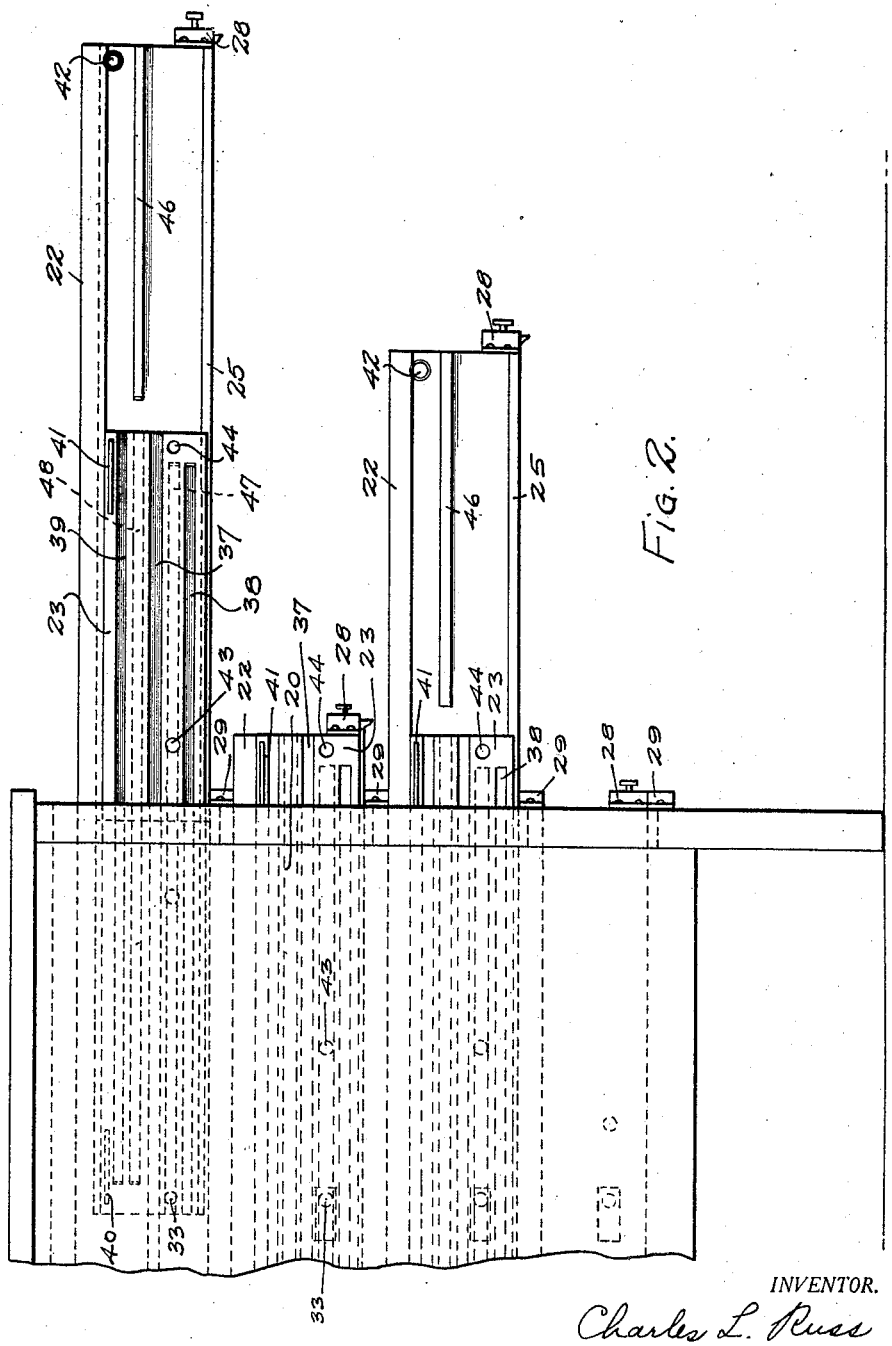

Sept. 18, 1928.
C. L. RUSS
1,684,889
DOUBLE ACTING DRAWER AND SLIDE THEREFOR
Filed April 2, 1928
7 Sheets-Sheet 3
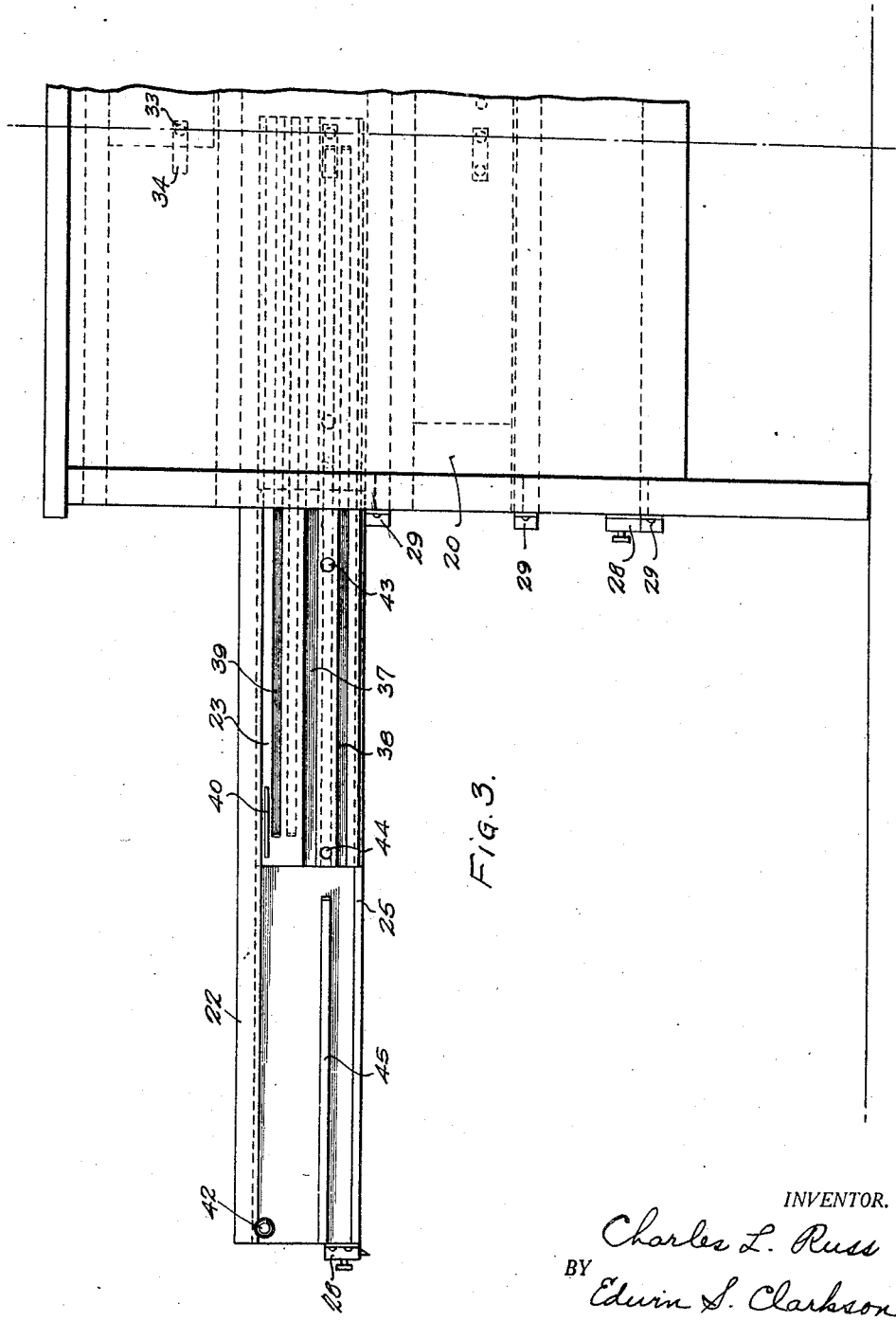
INVENTOR.
Charles L. Russ
BY Edwin S. Clarkson
ATTORNEY.

Sept. 18, 1928.
C. L. RUSS
1,684,889
DOUBLE ACTING DRAWER AND SLIDE THEREFOR
Filed April 2, 1928
7 Sheets-Sheet 4
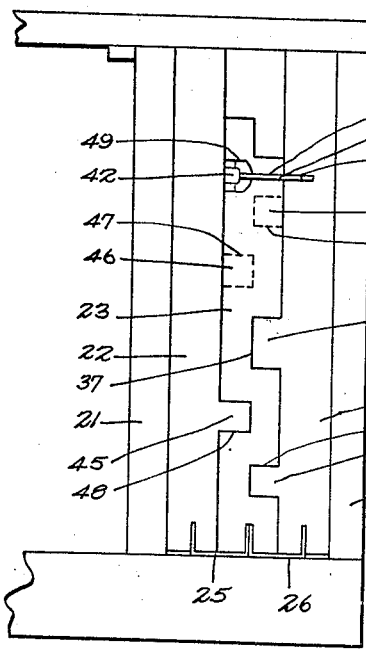
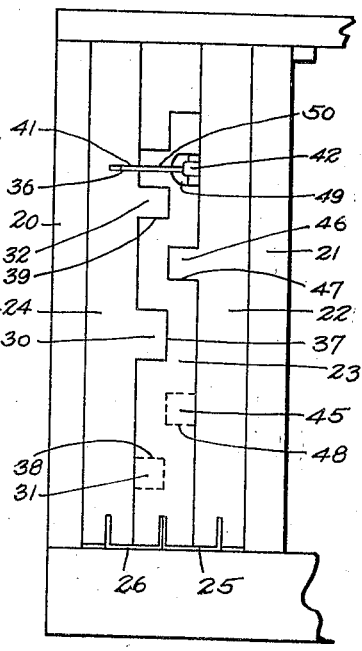
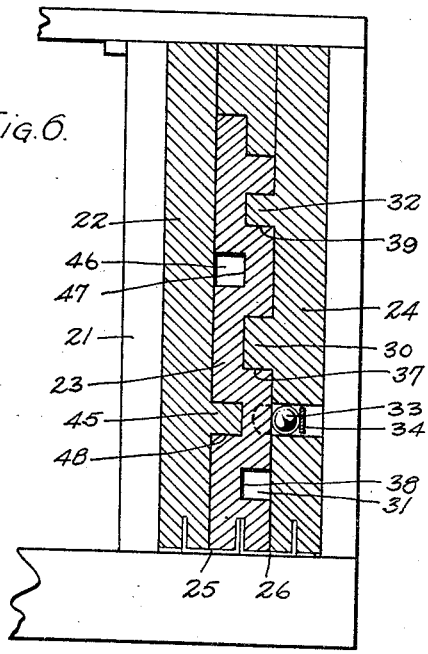
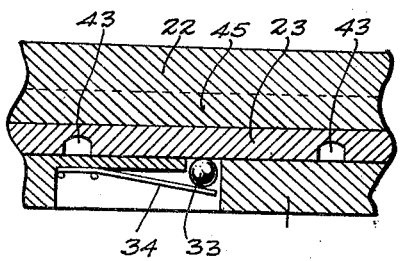
INVENTOR.
Charles L. Russ
BY Edwin S Clarkson
ATTORNEY.

Sept. 18, 1928.

C. L. RUSS 1,684,889

DOUBLE ACTING DRAWER AND SLIDE THEREFOR

Filed April 2, 1928      7 Sheets-Sheet 5

INVENTOR.
Charles L. Russ
BY Edwin S. Clarkson
ATTORNEY

Sept. 18, 1928.

C. L. RUSS 1,684,889

DOUBLE ACTING DRAWER AND SLIDE THEREFOR

Filed April 2, 1928    7 Sheets-Sheet 6

Inventor
Charles L. Russ
By Edwin S. Clarkson
Attorney

Sept. 18, 1928.

C. L. RUSS 1,684,889

DOUBLE ACTING DRAWER AND SLIDE THEREFOR

Filed April 2, 1928   7 Sheets-Sheet 7

INVENTOR.

Charles L. Russ

BY

Edwin S. Clarkson

ATTORNEY.

Patented Sept. 18, 1928.

1,684,889

UNITED STATES PATENT OFFICE.

CHARLES L. RUSS, OF LITTLE ROCK, ARKANSAS.

DOUBLE-ACTING DRAWER AND SLIDE THEREFOR.

Application filed April 2, 1928. Serial No. 266,626.

The invention relates to an improved double acting drawer and slide which may be opened in either direction, and which may be employed in desks, tables, cabinets and numerous other relations. The parts may be made of wood, or metal, as desired.

The drawer is designed to move freely in either direction, and is so constructed as to be adequately supported at all times, even when the drawer is in fully extended position. The drawer is also designed to be self-latching when pushed into closed position, and when in such position it is automatically centered within the desk so that no portion of the drawer projects beyond the desk in either direction. According to the preferred embodiment of the invention the drawer is provided with two slides, one at each side of the drawer. For the purpose of illustration, however, the device will be described in reference to a specific embodiment employing two slides, one at each side of the drawer.

The slides are composed of two members which are movable relative to each other, and also with reference to a fixed member, having parts cooperating with the slides. These slide members may be referred to as the sliding support and the extension slide, while the fixed member may be termed a guide. These terms are employed for facility in describing the invention, but are not intended as in any way limiting the invention. One of the features of the invention is to provide a friction means for retarding the action of the support member, with reference to the extension slide, so that there will be no tendency for the supporting slide to move in advance of the extension slide. A further object is to provide suitable locking or retaining means for the slides when the drawer is in fully opened or fully closed position. Other important objects will appear from the further detailed description of my invention which will follow.

I am aware that double acting drawers are in themselves broadly old, and also that various devices for regulating the action of one way single acting extension drawers have been designed, but so far as I am aware, no practical means has been designed for frictionally retarding the action of the supporting slide of a two way drawer in its relation to the extension slide.

An illustrative embodiment of the invention is set forth in the accompanying drawings, in which:

Figure 1 is a perspective view showing a desk provided with double acting two way extension drawers.

Figure 2 is a front elevation showing one-half of a desk with drawers opened at the right of the desk.

Figure 3 is a similar view showing drawers opened at the left.

Figure 4 is a fragmentary front elevation showing the assembled slides and guide member at one side of the drawer telescoped in the closed position of the drawers.

Figure 5 is a similar view at the other side of the drawer. Figure 6 is a section on line 6—6 of Figure 7.

Figure 7 is a fragmentary longitudinal section through the slides and guide member, showing the frictional retarding element.

Figure 8:
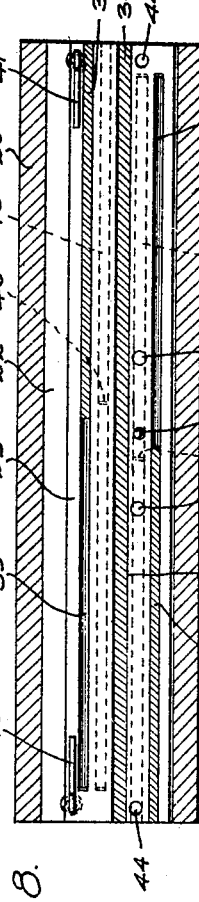
Figure 8 is a longitudinal section on line 8—8 of Figure 4, being cut through the ribs on the fixed guide member, these ribs appearing in section, and the slide members appearing in full or in dotted lines.

Referring to the drawings in detail, the reference numeral 20 denotes the frame work of a desk, table, cabinet or the like, which is equipped with double acting two way extension drawers, generally designated by the numerals 21 in Figure 1.

At each side of the drawers are slides which are the same in construction for all the drawers and accordingly only one slide need be described. The relation of parts is clearly shown in Figures 4, 5, 6 and 7 in which the drawer 21 is carried by a slide 22, which will be termed the extension slide, which slide is supported by a second sliding member 23, which may be termed the support, or supporting slide. The member 23 is slidably mounted upon a fixed guide member 24 which is secured to the frame 20 of the desk or the like. Metal runways 25, 26 may be provided at the base of the slides 22, 23, to facilitate their movement where the slides are made of wood.

It will be noted by reference to Figures 2 and 3 that the slides 22 and 23 are adapted to be moved in both directions from the desk 20, and when a drawer is closed it is held in this position by a latch 28, which engages a keeper 29 carried by the desk.

Figure 12:
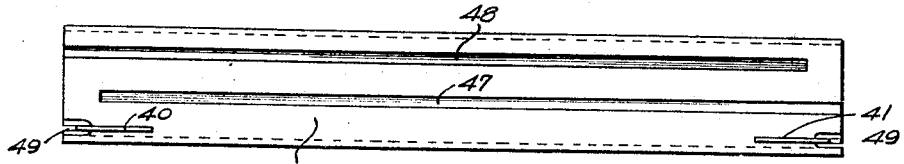
Figure 12 is an elevation showing the side of the supporting slide which is adapted to coact with the extension slide shown in Figure 11.
Figure 13:
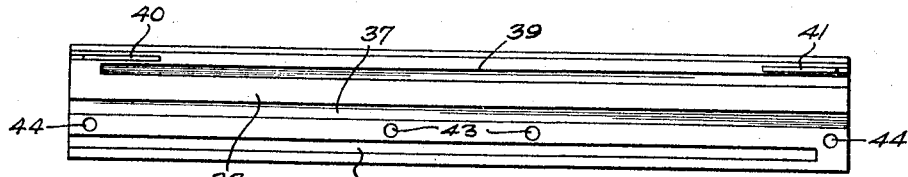
Figure 13 is an elevation showing the side of the supporting slide which is opposite to the side shown in Figure 12, and which coacts with the fixed guide member.
Figure 14:
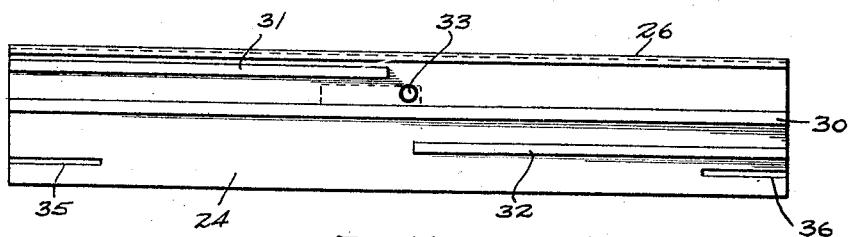
Figure 14 is an elevation of the side of fixed guide which cooperates with the parts shown in Figure 13.

The details of construction of the slides 22, 23, and guide member 24 may best be shown by reference to Figures 11, 12, 13 and 14. Figure 14 shows the face of the guide member 24 which coacts with the sliding support 23. This guide member is provided with a continuous center rib 30 and two side ribs 31 and 32 which extend nearly, but not quite, to the center of the guide member. At one side of the rib 31 and centrally located longitudinally is carried a retarding member in the form of a ball 33, which is pressed against the supporting slide 23, by the action of a spring 34, as shown in Figures 6 and 7, the function of which is to retard the movement of the supporting slide 23 with reference to the extension slide 22. Cam grooves 35, 36, are formed in the guide member 24, the purpose of which are to release the sliding support 23 from the extension slide 22, as the drawer is being opened, in a manner which will be more fully described hereinafter.

Figure 13 shows the face of the supporting slide 23 which coacts with the guide member when the parts are assembled as shown in Figures 4, 5, 6 and 7. The slide 23 is provided with a center groove 37 which extends the full length of the slide, and two side grooves 38 and 39 which extend nearly, but not quite, to the end of the slide, the distance from the ends being the same as the distance between the ends of ribs 31, 32, and the center of the guide 24. The grooves in slide 23 are engaged with the corresponding ribs in guide 24, as shown in Figures 2-10, inclusive.

Figure 15:
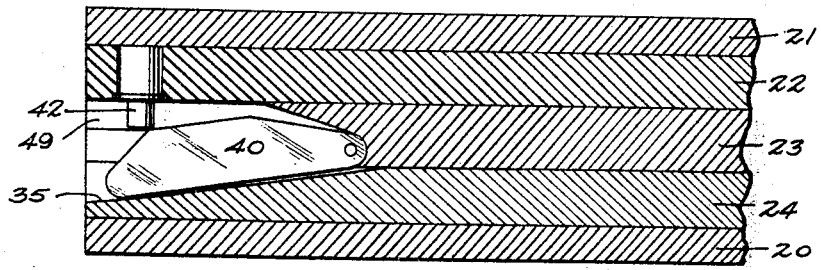
Figures 15, 16 and 17 are fragmentary views on an enlarged scale showing the automatic locking and releasing mechanism which becomes operative when the drawers are at the beginning of the opening movement and at the end of the closing movement.
Figure 17:
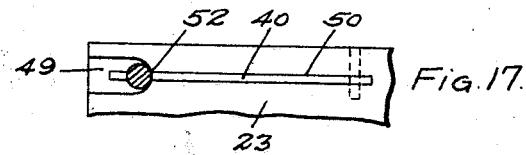
Figure 16:
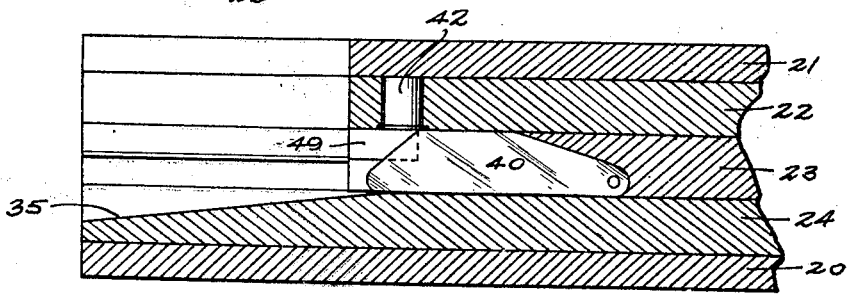
Figure 18:
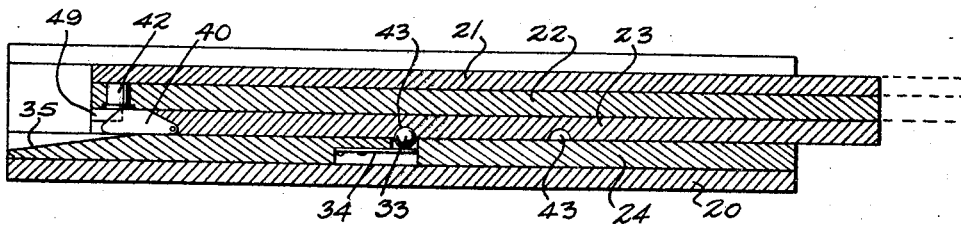
Figure 18 is a staggered longitudinal section on line 18—18 of Figure 8, the drawer being partly open.

Latch members 40, 41, are pivotally carried by the slide support in a manner more clearly shown in Figures 15 and 16. These latches engage in the cam grooves 35, 36, and as the drawer is pulled out in either direction moving the slides 22, 23, forward, the latch member at that end of the slide 23, which is away from the direction of movement is forced upwardly and raises a spring pressed detent 42 carried by the extension slide 22, thus permitting them to move independently thereafter.

Within the sliding support 23 are provided two apertures 43—43, near the center, and two others, 44—44, near the ends of the slide. These apertures are of a depth about one half the diameter of the ball 33.

Figure 11:
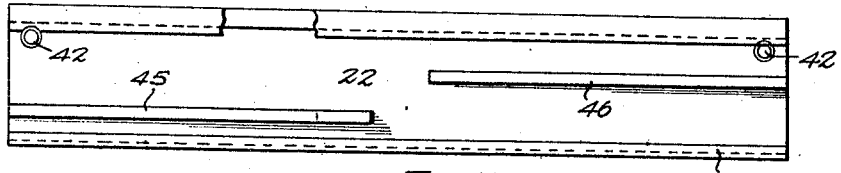
Figure 11 is a side elevation showing one side of the extension slide.

Figure 12 shows the side of the slide 23 which cooperates with the extension slide 22 shown in Figure 11. Ribs 45, 46, of slide 22 engage within grooves 47, 48, of slide 23. The plungers 42 of the extension slide engage in cutaway portions 49 at the ends of slots 50 (see Figures 15-18) within which the latches 40—40 are pivoted.

The operation of the device will now be dsecribed. When the desk drawer is fully closed in the position illustrated in Figures 8, 15 and 17, the detent 42 is engaged within the cutaway portion 49 and locks the slides 22 and 23 together so that there is no possibility of the slide 23 advancing before slide 22. As the drawer is opened slightly to the position shown in Figures 16 and 18 the plunger 42 is retracted by the action of the pivoted member 41, sliding in cam groove 35 of the guide member 24. The retraction of the plunger releases the slides 22, 23, permitting them to move independently.

Just as the slides are released from each other, however, the ball 33 is pressed by its spring into one of the holes 43, thus retarding the sliding support with reference to the extension slide. The supporting slide 23 is held in position until the end of one of the ribs of the extension slides reaches the end of its groove in the supporting slide, whereupon the ball 33 is disengaged from the hole 43 and the supporting slide then moves onward to the full extent permitted by the cooperating ribs and grooves of the guide member and supporting slide.

When the drawer is at its fully extended position it is firmly and rigidly held by reason of the fact that one-half of the supporting slide on each side of the drawer extends within the extension slide, and the other half remains within the desk in contact with the guide member 24.

Figure 9:
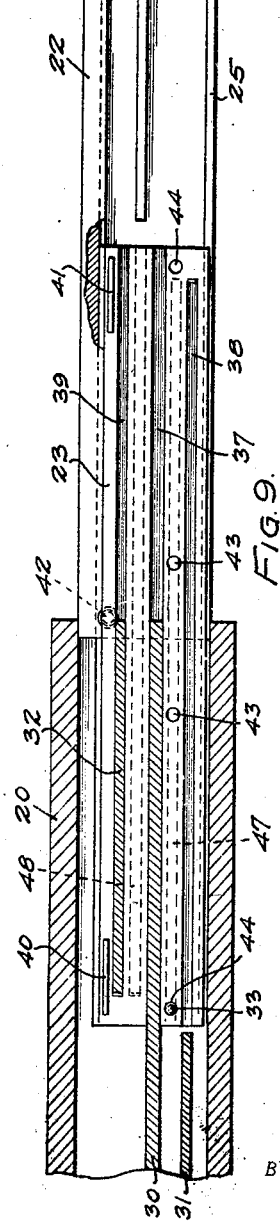
Figure 9 is a view similar to Figure 8, but showing the slides extended to the right.
Figure 10:
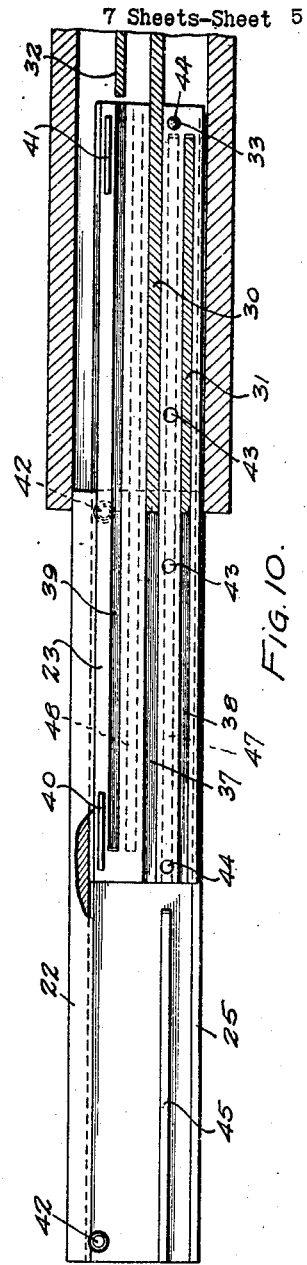
Figure 10 is a view similar to Figure 9, but showing the slides extended to the left.

At the fully extended position of the slides the ball 33 rests within one of the end holes 44 of the extension slide 23 as shown in Figures 9 and 10. As the drawer is shoved inwardly the ball retards the movement of the supporting slide so that it will not advance before the extension slide has been returned. When, however, the extension slide is telescoped upon the support, further inward pressure upon the drawer automatically releases the ball 33 and permits the supporting slide to return to the fully retracted position. In the closed position the extension slide is held by latches 28, 29, and the sliding support is held by the action of the plunger 42 which engages the shoulder 52 on the support and prevents movement thereof until released by the opening of the drawer in the manner previously described.

What I claim is:

1. In combination, a fixed guide member, a double acting slide adapted to be moved in either direction with reference to the guide member, said double acting slide comprising relatively movable supporting and extension slide members, means for automatically locking the supporting and extension slide members together when the two are telescoped, means for automatically releasing the slide members as the slides are moved upon the guide member, and frictional means for retarding the movement of the supporting slide with reference to the extension slide.

2. A supporting slide for use in the combination set forth in claim 1, said slide having on one side a central groove extending the full length of the slide, a pair of grooves on each side of the central groove extending from opposite ends of the slide and nearly, but not quite fully, across, a plurality of apertures formed in the slide, and a pair of pivoted latch members carried by the slide.

3. A fixed guide member for a double acting slide for use in the combination set forth in claim 1, said guide member having a central rib extending lengthwise fully across the guide member, a pair of side guide ribs extending from opposite ends less than halfway across the guide member, and a pair of cam slots at opposite ends of the guide member, and a centrally located spring pressed ball.

4. For use in the combination set forth in claim 1, a supporting slide having on one side thereof a pair of grooves extending from opposite ends nearly, but not quite fully, across the slide, a pair of latch grooves extending inwardly from the ends of the slide, the grooves having enlargements at the outer ends thereof.

5. As a new article of manufacture for use in the combination set forth in claim 1, an extension slide having on one side thereof a plurality of longitudinal ribs extending from opposite ends nearly but not quite to the center of the slide, and a pair of spring pressed plungers carried adjacent opposite ends of the slide.

6. In combination with a desk or the like, a double acting drawer adapted to be moved in either direction with reference to the desk, a pair of guide members carried by said desk, a pair of supporting arms slidable on said guide members, and a pair of extension slides carried by said drawer and slidable upon said extension arms manually releasable, means carried by said desk and said drawer for holding the drawer in centered position when closed, latching means carried by said supporting arms and extension slides for automatically securing the supporting arms and extension slides together when the drawer is closed, means for automatically releasing said latching means as the drawer is opened, and frictional means operable between the guide members and the supporting arms for retarding the action of the supporting arms with reference to the extension slides as the drawer is moved to the opened position, said retarding means becoming effective at the moment the supporting arms and extension slides are released from locking engagement with each other.

7. A double acting slide comprising a supporting slide and an extension slide, and frictional means for retarding the action of the supporting slide with reference to the extension slide in either direction of movement, said friction retarding means comprising a spring-pressed ball adapted to engage in apertures formed in the extension slide.

In testimony whereof I affix my signature.

CHARLES L. RUSS.